United States Patent
Nagura

(10) Patent No.: US 9,618,370 B2
(45) Date of Patent: Apr. 11, 2017

(54) OPTICAL ENCODER AND APPARATUS PROVIDED THEREWITH

(71) Applicant: CANON KABUSHIKI KAISHA, Tokyo (JP)

(72) Inventor: Chihiro Nagura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/675,944

(22) Filed: Apr. 1, 2015

(65) Prior Publication Data
US 2015/0285662 A1 Oct. 8, 2015

(30) Foreign Application Priority Data
Apr. 8, 2014 (JP) .................................. 2014-079401

(51) Int. Cl.
*G01D 5/38* (2006.01)
(52) U.S. Cl.
CPC ....................................... *G01D 5/38* (2013.01)
(58) Field of Classification Search
CPC .............................. G01D 5/34707; G01D 5/38
See application file for complete search history.

(56) References Cited

U.S. PATENT DOCUMENTS

| 2001/0017349 A1* | 8/2001 | Holzapfel | G01D 5/2457 250/231.13 |
|---|---|---|---|
| 2002/0159075 A1 | 10/2002 | Sakita | |
| 2003/0174344 A1 | 9/2003 | Jones et al. | |
| 2011/0222073 A1 | 9/2011 | Ishizuka | |
| 2013/0181121 A1* | 7/2013 | Tobiason | G01D 5/34792 250/231.1 |

FOREIGN PATENT DOCUMENTS

| EP | 2365292 A2 | 9/2011 |
|---|---|---|
| JP | 10-002761 A | 1/1998 |
| JP | 2011-185806 A | 9/2011 |

* cited by examiner

*Primary Examiner* — Tony Ko
(74) *Attorney, Agent, or Firm* — Fitzpatrick, Cella, Harper & Scinto

(57) ABSTRACT

The optical encoder includes a scale provided with a scale pattern reflecting or transmitting light from a light source, and a sensor receiving the light from the scale pattern. The sensor is provided with a light-receiving element array. The light-receiving element array includes multiple light-receiving element groups with a pitch P. Each group is constituted by two or more light-receiving elements whose outputs are added together. An intermediate pattern is provided between the scale and the sensor. The intermediate pattern includes a first pattern to form a first light intensity distribution with a first spatial period shorter than the pitch P on the light-receiving element array and a second pattern to form a second light intensity distribution with a second spatial period longer than the pitch P on the light-receiving element array.

12 Claims, 11 Drawing Sheets

OPTICAL ENCODER AND APPARATUS PROVIDED THEREWITH

BACKGROUND OF THE INVENTION

Field of the Invention

The present invention relates to an optical encoder.

Description of the Related Art

Optical encoders include one in which, as disclosed in Japanese Patent Laid-Open No. 2011-185806 and others, a mask having multiple slits (grating) is provided between a scale and a sensor (light-receiving element array). Using such a mask enables producing, in response to a relative movement of the scale and sensor, a sinusoidal signal with a far shorter signal period than an arrangement period of light-receiving elements in the light-receiving element array. Converting multiple sinusoidal signals whose phases are mutually different into position information by signal processing enables position detection with an extremely high resolution.

However, in such an optical encoder, change of a distance between the scale and sensor due to assembly errors such as mounting position variations of the scale, sensor and mask fluctuates a period of a spatial image formed on the light-receiving element array. This fluctuation decreases an amplitude of a position detection signal or changes a phase relation between the multiple sinusoidal signals, which may deteriorate position detection accuracy.

SUMMARY OF THE INVENTION

The present invention provides an optical encoder in which influence of assembly errors to its position detection accuracy is little and which is thereby capable of achieving a high position detection resolution. The present invention further provides an apparatus provided with the above optical encoder.

The present invention provides as an aspect thereof an optical encoder including a scale provided with a scale pattern that reflects or transmits light from a light source, and a sensor configured to receive the light from the scale pattern, the sensor and the scale being moved relatively to each other. The sensor is provided with a light-receiving element array including multiple light-receiving elements arranged in a relative movement direction of the sensor and scale. The light-receiving element array includes multiple light-receiving element groups each being constituted by two or more light-receiving elements whose outputs are added together, the multiple light-receiving element groups being arranged with a pitch P. An intermediate pattern is provided between the scale and the sensor, the intermediate pattern including a first pattern to form a first light intensity distribution with a first spatial period shorter than the pitch P on the light-receiving element array and a second pattern to form a second light intensity distribution with a second spatial period longer than the pitch P on the light-receiving element array.

Further features of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

Embodiment 1

Figure 1:
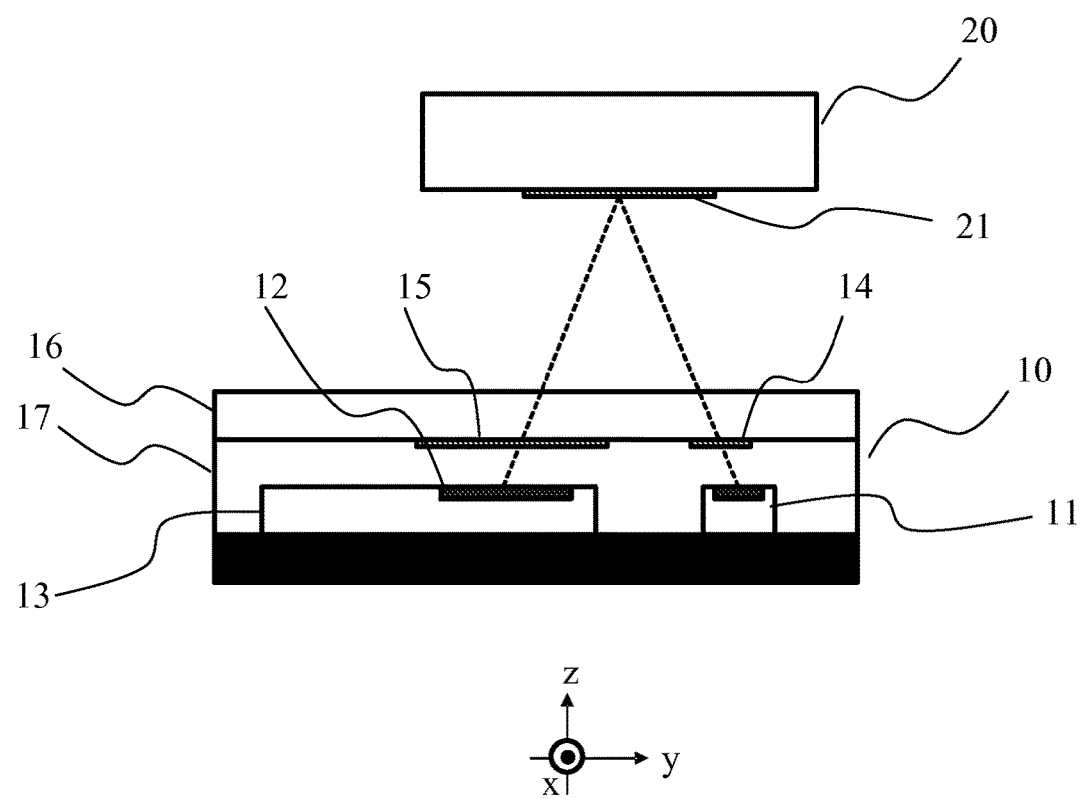
FIG. 1 shows a configuration of an optical encoder that is Embodiment 1 of the present invention.

FIG. 1 shows a configuration of an optical encoder (hereinafter simply referred to as "an encoder") that is a first embodiment (Embodiment 1) of the present invention. The encoder is a linear encoder constituted by a sensor unit 10 attached to an immovable (fixed) portion of an apparatus (not shown) and a scale 20 attached to a movable portion of the apparatus and movable together with the movable portion with respect to the sensor unit 10. A configuration may be employed in which the scale 20 is attached to the immovable portion of the apparatus and the sensor unit 10 is attached to the movable portion. That is, it is only necessary that the sensor unit 10 and the scale 20 be movable relatively to each other. In the following description, a direction (X direction in FIG. 1) in which the scale 20 is moved with respect to the sensor unit 10, that is, a relative movement direction of the scale 20 and sensor unit 10 is referred to as "a position detection direction".

The sensor unit 10 is a light-emitting/receiving element integrated sensor unit in which a light-emitting element 11 constituted by an LED and a light-receiving IC 13 including a light-receiving element array 12 are included in a single package. The light-receiving element array 12 is constituted by multiple light-receiving elements arranged in the position detection direction (X direction), as shown specifically in FIG. 3. The light-receiving elements detect an intensity distribution of light reflected by a scale pattern (described later) provided in the scale 20.

Figure 5:
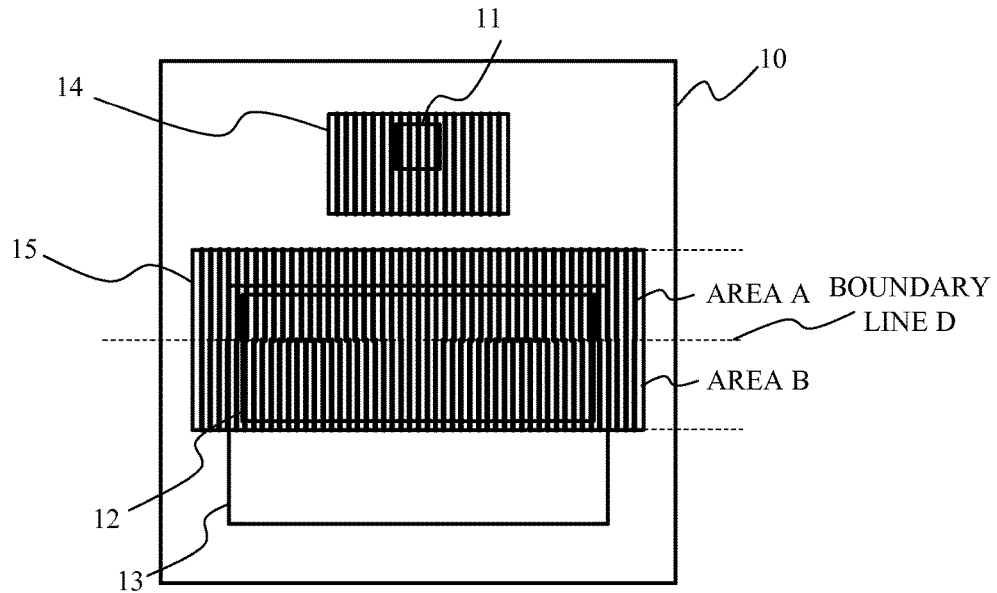
FIG. 5 is a top view showing a configuration of the sensor unit of Embodiment 1.

In an optical path from the light-emitting element 11 toward the scale 20, as shown specifically in FIG. 5, a light source grating (light source pattern) 14 as a first grating is provided. The light source grating 14 is formed as a transmissive diffraction grating constituted by light-transmissive portions and light-shielding portions arranged alternately in the position detection direction. In this embodiment, though description will be made in detail later, the light-emitting element 11 and the light source grating 14 constitute a light source.

The scale 20 is provided with the scale grating (scale pattern) 21 as a second grating. The scale grating 21 is formed as a reflective diffraction grating by reflective portions and non-reflective portions arranged alternately in the position detection direction. The scale grating 21 may be a phase grating including steps to provide periodically different optical path lengths. For example, providing a step having a height of ¼ of a wavelength of light from the light-emitting element 11 to the phase grating and forming an anti-reflection film evenly on the phase grating enables increasing a diffraction efficiency of plus/minus first-order refracted lights that contribute to signal output from the light-receiving element array 12.

In an optical path from the scale 20 toward the light-receiving element array 12 (that is, between the scale 20 and the light-receiving element array 12), an index grating (intermediate pattern) 15 as a third grating is provided. The index grating 15 is formed as a transmissive diffracting grating constituted by light-transmissive portions and light-shielding portions arranged alternately in the position detection direction. The light source grating 14 and the index grating 15 are each provided by forming chromium films to be used as the light-transmissive portions on one surface of a cover glass 16.

The cover glass 16 on which the light source grating 14 and the index grating 15 are formed is bonded to a light-transmissive plastic (resin) 17 sealing the light-emitting element 11 and the light-receiving IC 13, thereby being optically integrated with the light-emitting element 11 and the light-receiving IC 13.

Figure 2A:
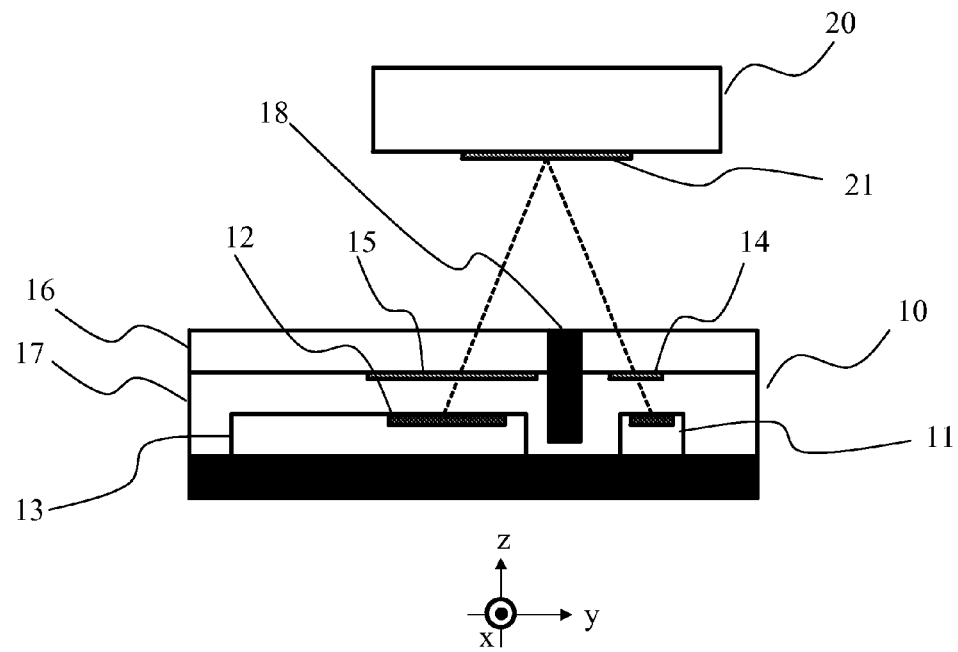
FIGS. 2A and 2B show modified examples of the encoder of Embodiment 1.

As shown in FIG. 2A, a light-shielding member 18 may be provided between the light-emitting element 11 and the light-receiving IC 13 in the sensor unit 10. The light-shielding member 18 can suppress light reflected inside the sensor unit 10 without being reflected by the scale grating 21 (for example, light internally reflected at a scale-side surface of the cover glass 16 that is an interface between the sensor unit 10 and air) from reaching the light-receiving element array 12. This configuration enables improving contrast of an output signal from the light-receiving element array 12.

Figure 2B:
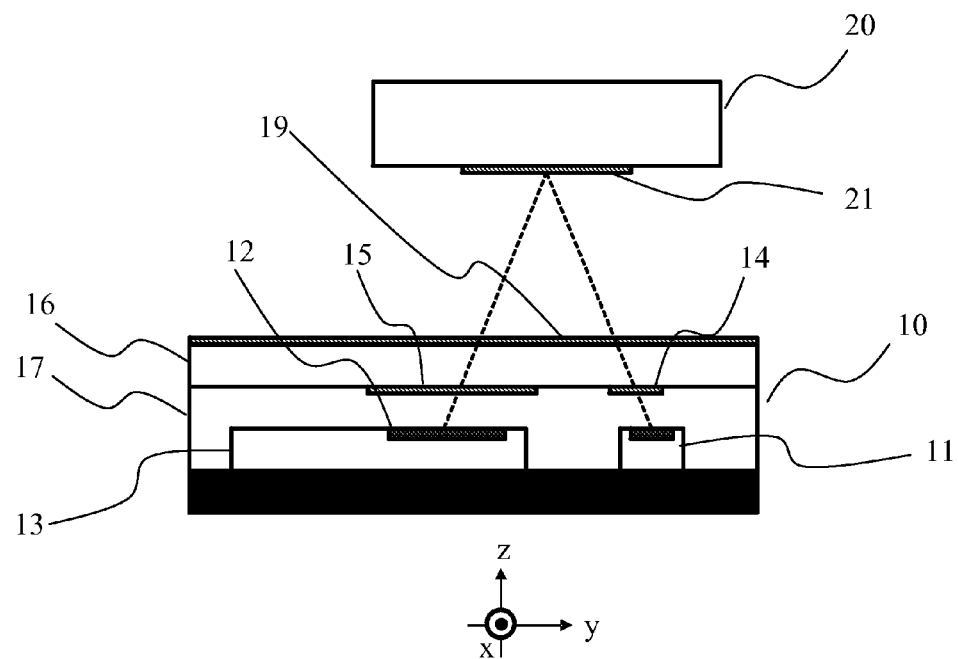

Furthermore, as shown in FIG. 2B, an anti-reflection film 19 may be provided on a scale-side external surface of the cover glass 16. This anti-reflection film 19 prevents part of light reflected at the scale grating 21 from not reaching the light-receiving element array 12 due to reflection at the scale-side external surface of the cover glass 16, thereby avoiding accuracy degradation of the output signal from the light-receiving element array 12.

Figure 3:
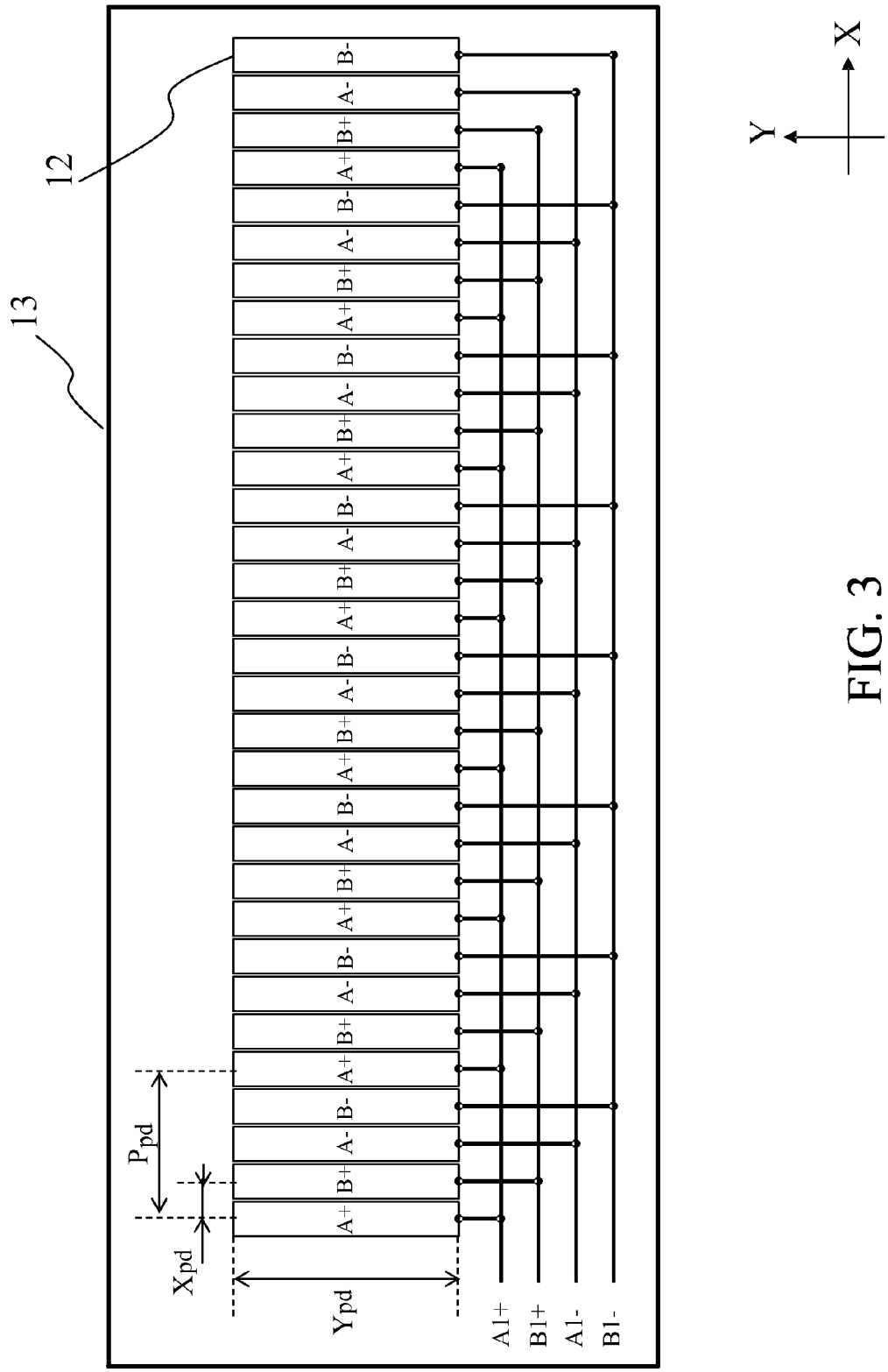
FIG. 3 shows an arrangement of light-receiving elements in a light-receiving element array provided in a sensor unit of the encoder of Embodiment 1.

FIG. 3 shows an arrangement of the multiple light-receiving elements constituting the light-receiving element array 12 in this embodiment. In this embodiment, light-receiving element array 12 is constituted by 32 light-receiving elements are arranged in a line in the position detection direction. In the position detection direction, a center-to-center distance (adjacent element pitch) of two mutually adjacent light-receiving elements is 64 µm. In a direction (Y direction) orthogonal to the position detection direction, a size (width) $Y_{pd}$ of each light-receiving element is 450 µm.

The 32 light-receiving elements are cyclically assigned to an A(+) phase, a B(+) phase, an A(−) phase and a B(−) phase in this order. Eight (that is, two or more) light-receiving elements assigned to each of the four phases constitute one light-receiving element group. That is, in this embodiment, four light-receiving element groups each constituted by the eight light-receiving elements are provided.

The eight light-receiving elements constituting each light-receiving element group are mutually electrically connected, and their outputs (currents) are added together to input to an IV conversion amplifier (not illustrated) subsequently provided for each phase. Of the eight light-receiving elements constituting the same light-receiving element group and arranged every four elements, two light-receiving elements closest to each other in the position detection direction has a center-to-center distance (in-group element pitch P) $P_{pd}$ of 256 (=64×4) µm.

An output of the IV conversion amplifier provided for each phase is a voltage signal (sinusoidal signal) whose value changes sinusoidally with movement of the scale 20. The outputs of the four IV conversion amplifiers provided for the four phases respectively correspond to signal phases of 0 degree, 90 degrees, 180 degrees and 270 degrees and are converted into position information by calculation processing.

Figure 4:
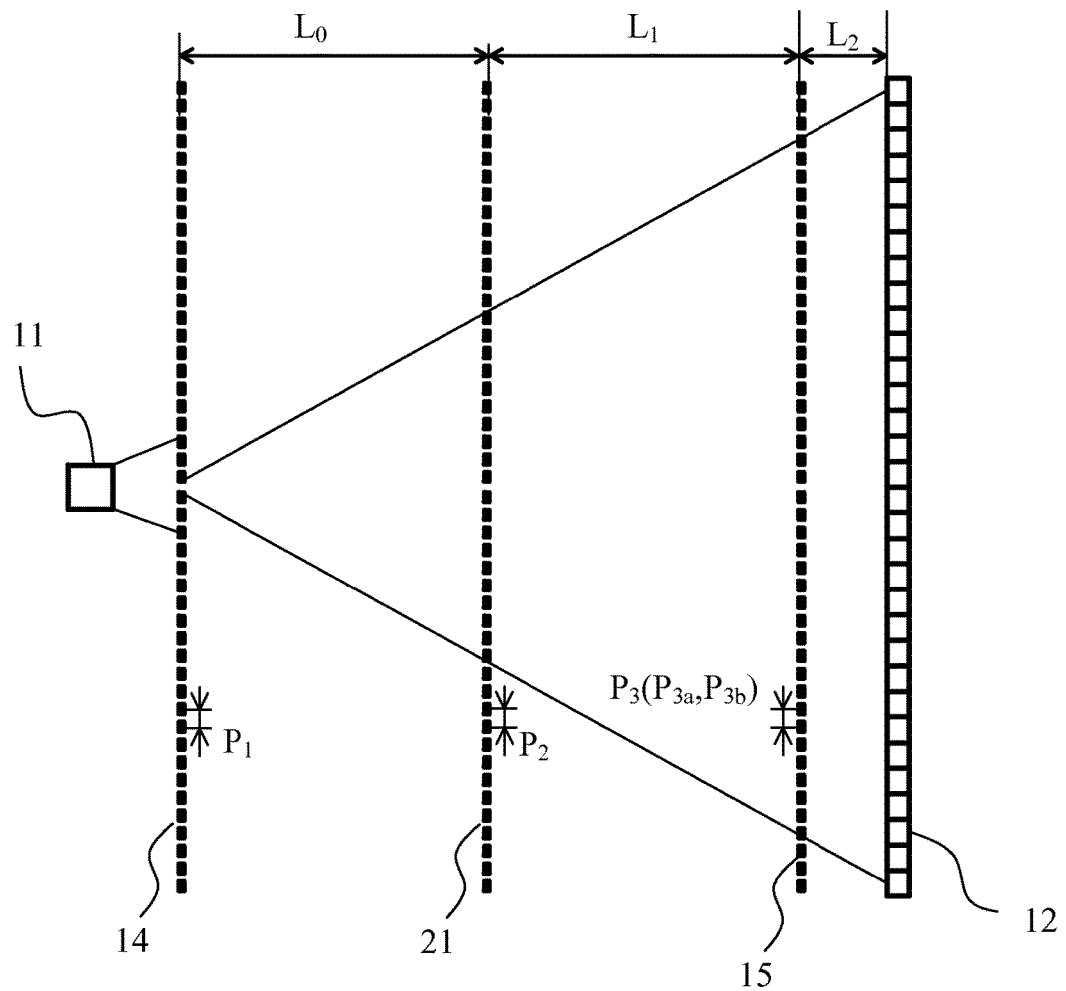
FIG. 4 is a development view showing an optical path in the encoder of Embodiment 1.

FIG. 4 shows the optical paths in the encoder of this embodiment in a developed manner, namely, in which reflection is shown like transmission. A distance $L_0$ from the light source grating (secondary point light sources described later) 14 constituting the light source with the light-emitting element 11 to the scale grating 21 is set to a value in a range of 1±0.3 mm. A distance $L_1$ from the scale grating 21 to the index grating 15 is set to a value equal to $L_0$ (or to a value in a range that can be regarded as being equal to $L_0$). In this embodiment, $L_0$ and $L_1$ are each 1 mm. A distance $L_2$ as an effective optical path length from the index grating 15 to the light-receiving element array 12 is 0.2 mm. The effective optical path length is a value obtained by dividing a physical length by a refractive index.

FIG. 5 shows the configuration of the sensor unit 10 viewed from the scale 20 (that is, from a scale side). The light source grating 14 has a grating pitch $P_1$ of 4 µm, and the scale grating 21 also has a grating pitch $P_2$ of 4 µm. The index grating 15 is divided in the direction (Y direction) orthogonal to the position detection direction (X direction) into two areas with a boundary line D as a straight line extending in the position detection direction. Of the two areas, one closer to the light source grating 14 (light emitting element 11) is defined as an area A, and the other one farther from the light source grating 14 is defined as an area B. The boundary line D is set so as to intersect, on the index grating 15, when $L_0$ and $L_1$ are each 1 mm, with a principal ray (central ray) of a light flux emitted from the light-emitting element 11 and reaching the light-receiving element array 12.

In the area A in the index grating 15, a first index grating (first pattern) having a first grating pitch in the position detection direction is provided. The first grating pitch $P_{3a}$ is 4.074406 µm. In the area B in the index grating 15, a second index grating (second pattern) having a second grating pitch in the position detection direction is provided. The second grating pitch $P_{3b}$ is 4.065509 µm.

A divergent light flux emitted from the LED as the light-emitting element 11 passes through the light source grating 14 and thereby forms a light source array including multiple secondary point light sources as mutually incoherent light sources. The divergent light flux passing through the light source grating 14 reaches the scale grating 21. Although in this embodiment the secondary point sources are formed by a combination of the LED and the light source grating 14, current confinement structure LEDs, semiconductor lasers or the like may be alternatively provided as effective point light sources.

Furthermore, although in this embodiment the divergent light flux from each point light source on the light source grating 14 directly reaches the scale grating 21, a configuration may be alternatively employed which causes the light flux to reach the scale grating 21 from an effective point light source whose position is converted by using a lens. In this configuration, $L_0$ is replaced with a distance between the effective point light source and the scale grating 21.

The plus first-order and minus first-order diffracted lights reflected by the scale grating 21 interfere with each other on the index grating 15 to form interference fringes having a light intensity distribution with a period of 4 µm. On the other hand, since the first and second grating pitches $P_{3a}$ and $P_{3b}$ of the index grating 15 are slightly different from (larger than) 4 µm, a light intensity distribution (interference fringes) on which a coarser spatial period Pm than that of the original interference fringes is superimposed passes through the index grating 15.

When $P_3$ represents the grating pitch ($P_{3a}$, $P_{3b}$) of the index grating 15, the spatial period Pm can be expressed by the following expression:

$$P_m = ABS(P_2 \cdot P_3/(P_2 - P_3))$$

where ABS(x) represents a function showing an absolute value of x.

The light intensity distribution with the spatial period Pm which has passed through the index grating 15 further propagates to be projected on the light-receiving element array 12 with an image magnification M. That is, on the light-receiving element array 12, a light intensity distribution with a spatial period $M \cdot P_m$ is formed.

The image magnification M is expressed as follows:

$$M = (L_0 + L_1 + L_2)/(L_0 + L_1).$$

In this embodiment, $$M = (1 + 1 + 0.2)/(1 + 1)$$
$$= 1.1.$$

For this reason, on the light-receiving element array 12, a light intensity distribution (first light intensity distribution) with the following spatial period (first spatial period) $M \cdot P_m$ is formed by the first index grating (area A):

$$M \cdot P_m = 1.1 \times ABS(4 \times 4.074406/(4 - 4.074406))$$
$$= 240.9432 \text{ µm}.$$

Furthermore, a light intensity distribution (second light intensity distribution) with the following spatial period (second spatial period) $M \cdot P_m$ is formed by the second index grating (area B):

$$M \cdot P_m = 1.1 \times ABS(4 \times 4.065509/(4 - 4.065509))$$
$$= 273.0653 \text{ µm}.$$

Thus, on the light-receiving element array 12, the light intensity distribution with a shorter spatial period (240.9432 µm) than the in-group element pitch $P_{pd}$ (=256 µm) that is the pitch between the light-receiving elements constituting the same light-receiving element group and the light intensity distribution with a longer spatial period (273.0653 µm) than the in-group element pitch $P_{pd}$ are formed. That is, the index grating 15 includes the first index grating (area A) forming the light intensity distribution with the shorter spatial period than the in-group element pitch $P_{pd}$ on the light-receiving element array 12 and the second index grating (area B) forming the light intensity distribution with the longer spatial period than the in-group element pitch $P_{pd}$ thereon.

A response characteristic of the sinusoidal output from the light-receiving element array 12 (IV conversion amplifier) to a spatial frequency of the light intensity distribution projected (formed) on the light-receiving element array 12 has a peak at $1/P_{pd}$.

That is, when $M \cdot P_m = P_{pd}$, a signal amplitude of the sinusoidal output becomes maximum.

When $P_{3max}$ represents the grating pitch $P_3$ of the index grating 15 corresponding to when the signal amplitude of the sinusoidal output becomes maximum, the following equation holds:

$$P_{3max} = \frac{P_{pd} \cdot P_2 \cdot (L_0 + L_1)}{P_{pd} \cdot (L_0 + L_1) \pm P_2 \cdot (L_0 + L_1 + L_2)}.$$

$P_{3max1}$ and $P_{3max2}$ representing two solutions of the above equation can be expressed as follows:

$$P_{3max1} = \frac{P_{pd} \cdot P_2 \cdot (L_0 + L_1)}{P_{pd} \cdot (L_0 + L_1) + P_2 \cdot (L_0 + L_1 + L_2)}$$

$$P_{3max2} = \frac{P_{pd} \cdot P_2 \cdot (L_0 + L_1)}{P_{pd} \cdot (L_0 + L_1) - P_2 \cdot (L_0 + L_1 + L_2)}.$$

Figure 6:
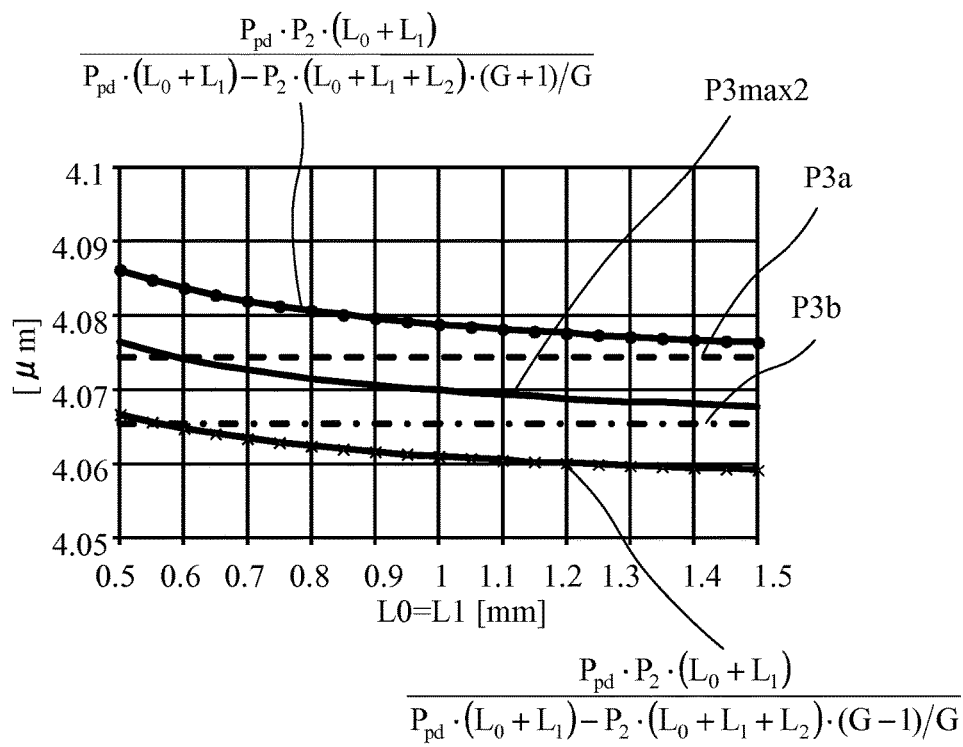
FIG. 6 is a graph showing a relation between $L_0$, $L_1$ and $P_{3max2}$, $P_{3a}$, $P_{3b}$ in the encoder of Embodiment 1.

For example, when $L_0 = L_1 = 1$ mm,
$P_{3max1} = 3.932412$ µm
$P_{3max2} = 4.069952$ µm.
FIG. 6 shows a relation between $L_0$, $L_1$ and $P_{3max2}$, $P_{3a}$, $P_{3b}$ in this embodiment. As understood from FIG. 6, $P_{3a}$ and $P_{3b}$ satisfy a relation (condition) expressed by following expression (1) in a range of $L_0 = L_1 = 1 \pm 0.3$ mm:

$$P_{3a} > \frac{P_{pd} \cdot P_2 \cdot (L_0 + L_1)}{P_{pd} \cdot (L_0 + L_1) - P_2 \cdot (L_0 + L_1 + L_2)} = P_{3max2} > P_{3b}. \quad (1)$$

Figure 7A:
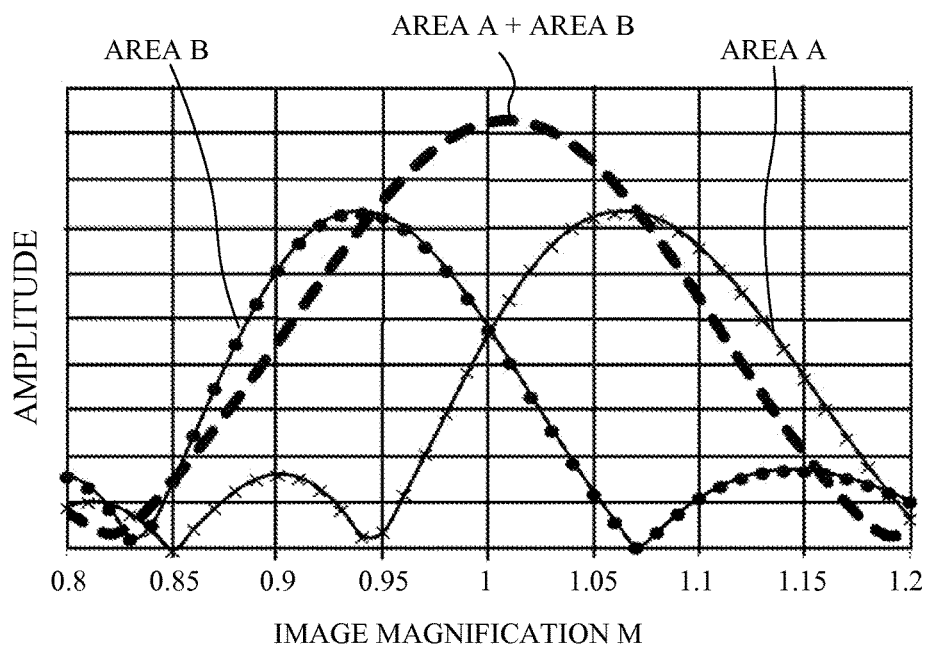
FIG. 7A is a graph showing a change of a signal amplitude of an A(+) phase to an image magnification M in the encoder of Embodiment 1.
Figure 7B:
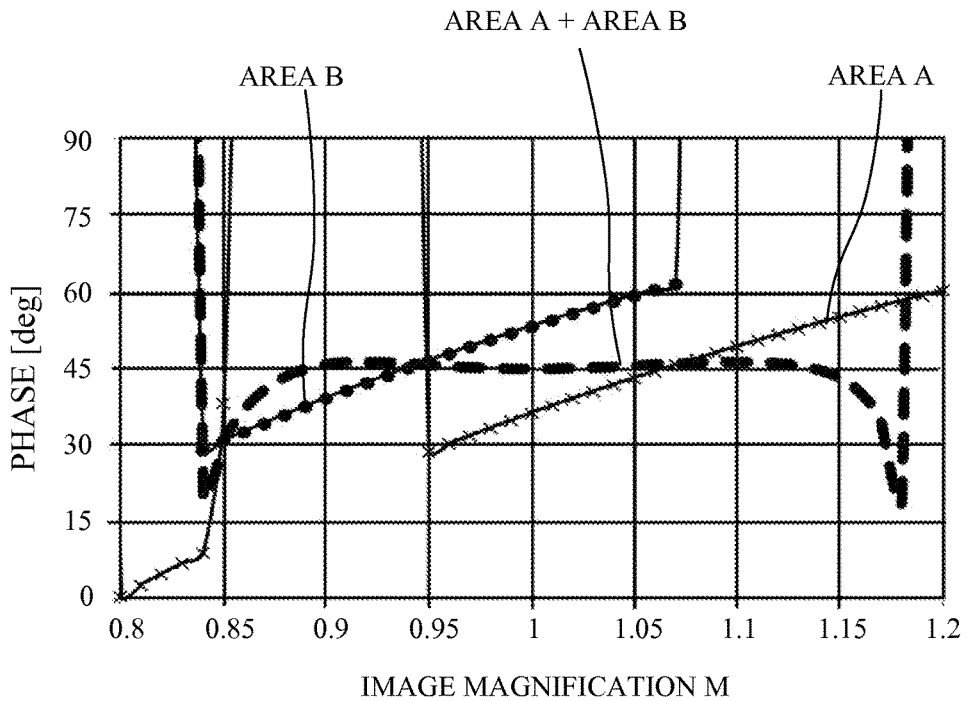
FIG. 7B is a graph showing a change of a signal phase to the image magnification M in the encoder of Embodiment 1.

FIG. 7A shows a change of the signal amplitude of the A(+) phase with respect to the image magnification M in this embodiment, and FIG. 7B shows a change of the signal phase of the A (+) phase with respect to the image magnification M in this embodiment. A signal generated by the light-receiving element array 12 corresponding to the light intensity distribution formed by the first index grating (area A) of the index grating 15 is referred to as "an area A signal", which is simply shown as "AREA A" in the figures. A signal generated by the light-receiving element array 12 corresponding to the light intensity distribution formed by the second index grating (area B) of the index grating 15 is referred to as "an area B signal", which is simply shown as "AREA B" in the figures.

As shown in FIG. 7A, amplitudes of the area A and area B signals have, by the satisfaction of the above relation shown by expression (1), mutually different peak points for variation of the image magnification M. As a result, an amplitude fluctuation of the output signal of each phase from the light-receiving element array 12 which is generated by adding the area A and area B signals together is suppressed.

Furthermore, as shown in FIG. 7B, phases of the area A and area B signals respectively change with variation of the image magnification M. However, the satisfaction of the above relation shown by expression (1) changes weights of the area A and area B signals such that their phase fluctuations are mutually canceled, and thereby the phase fluctuation of the output signal of each phase from the light-receiving element array 12 which is generated by adding the area A and area B signals together is suppressed. This applies to the B(+) phase, the A(−) phase and the B(−) phase.

When $P_{3a}$ and $P_{3b}$ satisfy a relation (condition) expressed by following expression (2), same effects as those described above are provided.

$$P_{3a} < \frac{P_{pd} \cdot P_2 \cdot (L_0 + L_1)}{P_{pd} \cdot (L_0 + L_1) + P_2 \cdot (L_0 + L_1 + L_2)} < P_{3b}. \quad (2)$$

That is, it is sufficient that the grating pitch (first grating pitch) $P_{3a}$ of the first index grating and the grating pitch (second grating pitch) $P_{3b}$ of the second index grating satisfy the relation shown by expression (1) or (2).

Moreover, when M represents number of the multiple light-receiving elements included in the light-receiving element array 12, N represents number of the light-receiving elements constituting each light-receiving element group, and G represents number of the light-receiving element groups (G=M/N=32/8=4 in this embodiment), it is desirable that the grating pitch $P_{3a}$ of the first index grating and the grating pitch $P_{3b}$ of the second index grating satisfy a relation shown by following expression (3) or (4):

$$\frac{P_{pd} \cdot P_2 \cdot (L_0 + L_1)}{P_{pd} \cdot (L_0 + L_1) + P_2 \cdot (L_0 + L_1 + L_2) \cdot (G+1)/G} \leq \quad (3)$$

$$P_{3a} < \frac{P_{pd} \cdot P_2 \cdot (L_0 + L_1)}{P_{pd} \cdot (L_0 + L_1) + P_2 \cdot (L_0 + L_1 + L_2)} < P_{3b} \leq$$

$$\frac{P_{pd} \cdot P_2 \cdot (L_0 + L_1)}{P_{pd} \cdot (L_0 + L_1) + P_2 \cdot (L_0 + L_1 + L_2) \cdot (G-1)/G}$$

$$\frac{P_{pd} \cdot P_2 \cdot (L_0 + L_1)}{P_{pd} \cdot (L_0 + L_1) - P_2 \cdot (L_0 + L_1 + L_2) \cdot (G+1)/G} \geq \quad (4)$$

$$P_{3a} > \frac{P_{pd} \cdot P_2 \cdot (L_0 + L_1)}{P_{pd} \cdot (L_0 + L_1) - P_2 \cdot (L_0 + L_1 + L_2)} > P_{3b} \geq$$

$$\frac{P_{pd} \cdot P_2 \cdot (L_0 + L_1)}{P_{pd} \cdot (L_0 + L_1) - P_2 \cdot (L_0 + L_1 + L_2) \cdot (G-1)/G}$$

Satisfying the relation shown by expression (3) or (4) monotonously increases one of the amplitude fluctuations of the area A and area B signals and monotonously decreases the other thereof for the variation of the image magnification M. This satisfaction of the relation enables enhancing the effect of suppressing the amplitude fluctuation of the output signal of each phase from the light-receiving element array 12 which is generated by adding the area A and area B signals together.

As described above, this embodiment enables realizing a high resolution encoder whose position detection accuracy is little influenced by assembly errors of the sensor unit 10 and scale 20.

Embodiment 2

Figure 8:
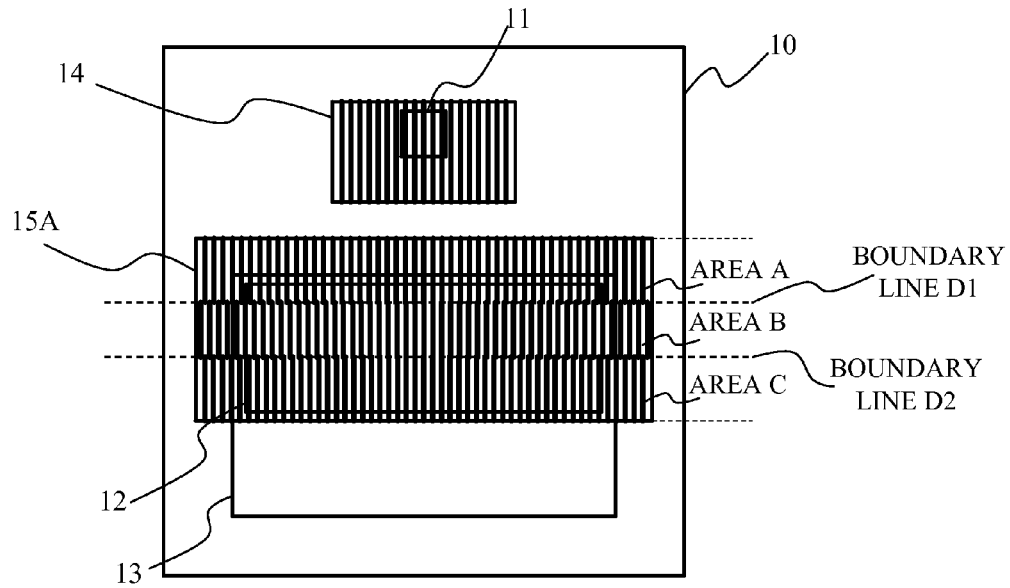
FIG. 8 is a top view showing a configuration of a sensor unit of an optical encoder that is Embodiment 2 of the present invention.

FIG. 8 shows a configuration of a sensor unit 10A of an optical encoder that is a second embodiment (Embodiment 2) of the present invention; FIG. 8 shows the sensor unit 10B from a scale side. Constituent elements in this embodiment identical to those in Embodiment 1 are denoted by same reference numerals as those in Embodiment 1, and description thereof is omitted.

An index grating 15A used in the sensor unit 10A is divided in the direction (Y direction) orthogonal to the position detection direction (X direction) into three areas with boundary lines D1 and D2 as straight lines extending in the position detection direction. Of the three areas, one closest to the light source grating 14 (light emitting element 11) is defined as an area A, another one farthest from the light source grating 14 is defined as an area C, and the remaining one between the area A and the area B is defined as an area C.

The boundary line D1 is set so as to intersect, on the index grating 15A, when $L_0$ and $L_1$ are each 1 mm, with an intermediate ray between a principal ray (central ray) of a light flux emitted from the light-emitting element 11 to reach the light-receiving element array 12 and one end ray thereof reaching one light-receiving element array end closest to the light-emitting element array 11. The boundary line D2 is set so as to intersect, on the index grating 15A, when $L_0$ and $L_1$ are each 1 mm, with an intermediate ray between the principal ray (central ray) of the light flux emitted from the light-emitting element 11 to reach the light-receiving element array 12 and another end ray thereof reaching another light-receiving element array end farthest from the light-emitting element array 11.

In the area A, an index grating having a grating pitch $P_{3a}$ in the position detection direction is provided. The grating pitch $P_{3a}$ is 4.078869 μm. In the area B, an index grating having a grating pitch $P_{3b}$ in the position detection direction is provided. The grating pitch $P_{3b}$ is 4.069952 μm. In the area C, an index grating having a grating pitch $P_{3c}$ in the position detection direction is provided. The grating pitch $P_{3c}$ is 4.061075 μm.

Figure 9:
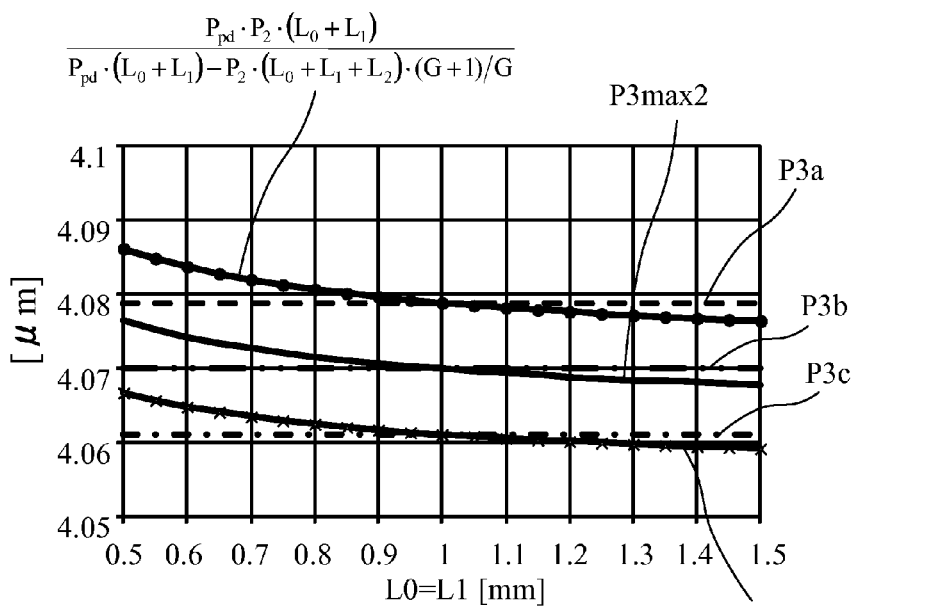
FIG. 9 is a graph showing a relation between $L_0$, $L_1$ and $P_{3max2}$, $P_{3a}$, $P_{3b}$, $P_{3c}$ in the encoder of Embodiment 2.

FIG. 9 shows a relation between $L_0$, $L_1$ and $P_{3max2}$, $P_{3a}$, $P_{3b}$, $P_{3c}$ in this embodiment. In this embodiment, depending on whether $L_0$ and $L_1$ are shorter or longer than 1 mm, any two of the three areas A, B and C correspond to the first and second index gratings described in Embodiment 1.

Specifically, when $L_0=L_1<1$ mm, the index grating (grating pitch $P_{3a}$) of the area A and the index grating (grating pitch $P_{3b}$) of the area B respectively correspond to the first index grating and the second index grating. When $L_0=L_1>1$ mm, the index grating (grating pitch $P_{3b}$) of the area B and the index grating (grating pitch $P_{3c}$) of the area C respectively correspond to the first index grating and the second index grating.

Figure 10A:
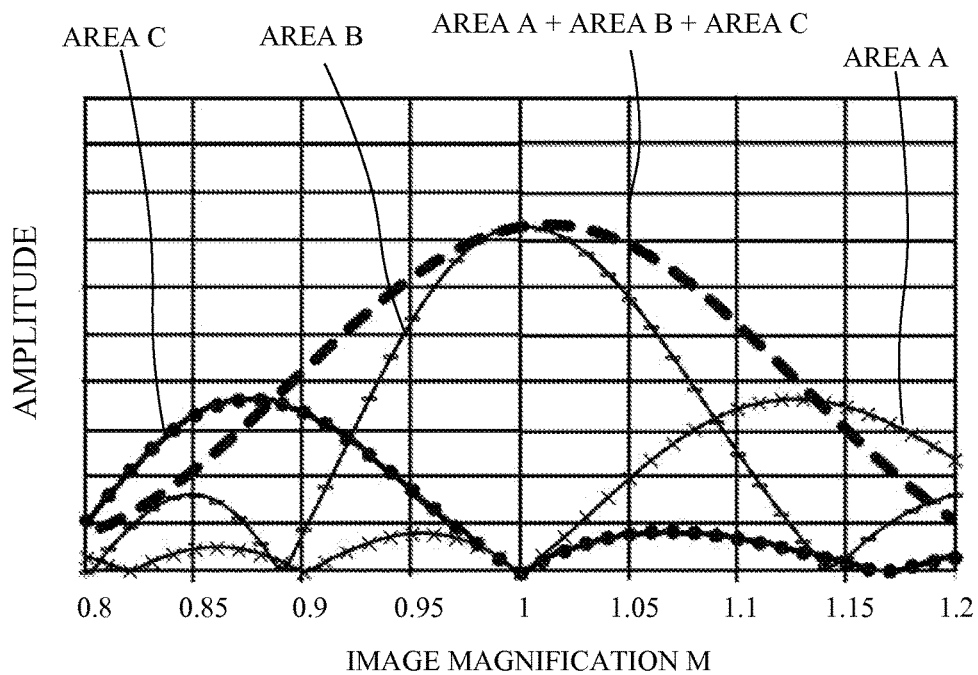
FIG. 10A is a graph showing a change of a signal amplitude of an A(+) phase to an image magnification M in the encoder of Embodiment 2.
Figure 10B:
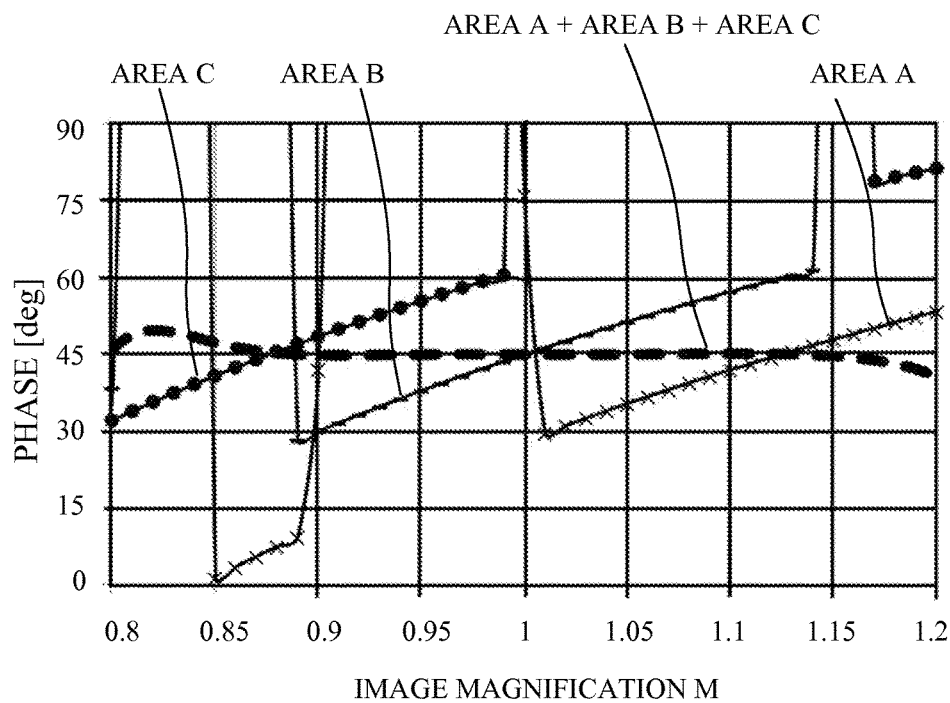
FIG. 10B is a graph showing a change of a signal phase to the image magnification M in the encoder of Embodiment 2.

FIG. 10A shows a change of the signal amplitude of the A(+) phase with respect to the image magnification M in this embodiment, and FIG. 10B shows a change of the signal phase of the A (+) phase with respect to the image magnification M in this embodiment. A signal generated by the light-receiving element array 12 corresponding to a light intensity distribution formed by the index grating of the area A of the index grating 15A is referred to as "an area A signal", which is simply shown as "AREA A" in the figures. A signal generated by the light-receiving element array 12 corresponding to a light intensity distribution formed by the index grating of the area B is referred to as "an area B signal", which is simply shown as "AREA B" in the figures. A signal generated by the light-receiving element array 12 corresponding to a light intensity distribution formed by the index grating of the area C is referred to as "an area C signal", which is simply shown as "AREA C" in the figures.

As shown in FIG. 10A, amplitudes of the area A, area B and area C signals have, by the satisfaction of the above relation shown by expression (1) and (2) in Embodiment 1, mutually different peak points for variation of the image magnification M. As a result, an amplitude fluctuation of the output signal of each phase from the light-receiving element array 12 which is generated by adding the area A, area B and area C signals together is suppressed.

Furthermore, as shown in FIG. 10B, phases of the area A, area B and area C signals respectively change with variation of the image magnification M. However, the satisfaction of the relation shown by expression (1) or (2) changes weights of the area A, area B and area C signals such that their phase fluctuations are mutually canceled. Therefore, the phase fluctuation of the output signal of each phase from the light-receiving element array 12 which is generated by adding the area A, area B and area C signals together is suppressed. This applies to the B(+) phase, the A(−) phase and the B(−) phase.

Providing such three index gratings (areas A, B and C) having mutually different grating pitches in the index grating 15A and combining them with one another enables achieving a characteristic stable against a larger variation of the image magnification M as compared to Embodiment 1.

Although this embodiment described the case of providing three index gratings (three areas) having mutually different grating pitches, providing four or more index gratings also enables achieving a characteristic stable against a larger variation of the image magnification M as well as this embodiment.

Embodiment 3

Figure 11:
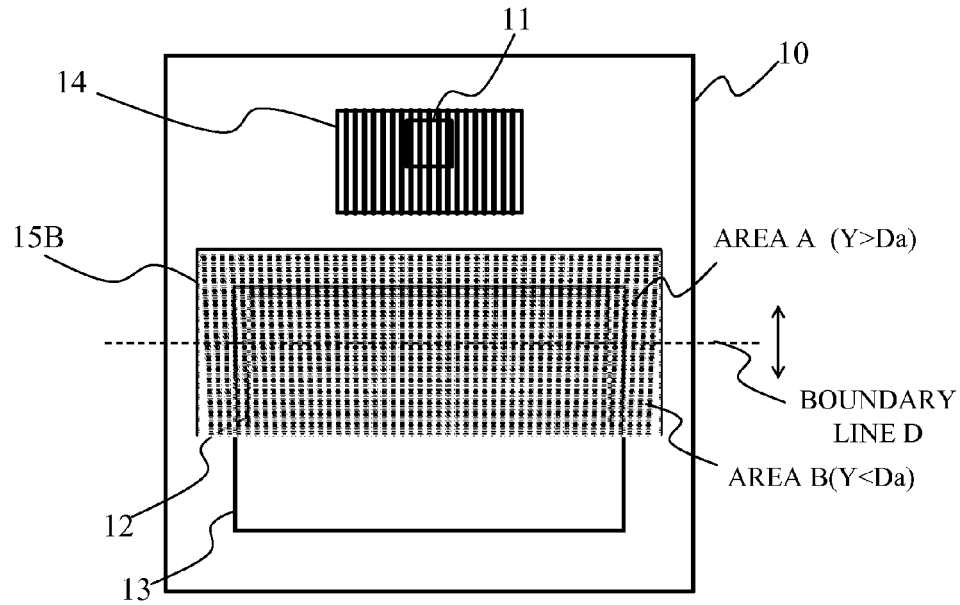
FIG. 11 is a top view showing a configuration of a sensor unit of an optical encoder that is Embodiment 3 of the present invention.

FIG. 11 shows a configuration of a sensor unit 10B of an optical encoder that is a third embodiment (Embodiment 3) of the present invention; FIG. 11 shows the sensor unit 10B from a scale side. Constituent elements in this embodiment identical to those in Embodiment 1 are denoted by same reference numerals as those in Embodiment 1, and description thereof is omitted.

In an index grating 15B used for the sensor unit 10B in this embodiment, a grating pitch in the position detection direction (X direction) continuously changes in the direction (Y direction) orthogonal to the position detection direction. When $L_0$ and $L_1$ are each 1 mm, a position on the index grating 15B at which a principal ray (central ray) of a light flux emitted from the light-emitting element 11 and reaching the light-receiving element array 12 intersects with the index grating 15B is defined as Y=0, and a direction approaching the light-emitting element 11 is defined as a positive direction (Y>0).

The grating pitch P3(Y) of the index grating 15B in the position detection direction changes according to a function expressed by the following expression:

$$P3(Y) = 0.0434964 \cdot Y + 4.069952 \text{ (μm)}.$$

In the index grating 15B in this embodiment, a straight line passing through a position Y0 satisfying the following relation and extending in the position detection direction is defined as a boundary line D.

$$P3(Y0) = P_{3max} = \frac{P_{pd} \cdot P_2 \cdot (L_0 + L_1)}{P_{pd} \cdot (L_0 + L_1) - P_2 \cdot (L_0 + L_1 + L_2)}$$

For example, when $L_0=L_1=1$ mm, P3(0) is equal to $P_{3max}$. Therefore, the boundary line D is located at Y=0. A variation of the values of $L_0$ and $L_1$ shifts the position Da of the boundary line D. In this case, an index grating in an area A where Y>Da corresponds to a first index grating, and an index grating in an area B where Y<Da corresponds to a second index grating. This embodiment enables providing same effects as those of Embodiment 1.

Embodiment 4

Next, description will be made of an optical encoder that is a fourth embodiment (Embodiment 4) of the present invention. The encoder of this embodiment forms a doubled period image of the scale grating 21 as interference fringes on the light-receiving element array 12. The encoder of this embodiment includes a sensor unit whose configuration viewed from a scale side is identical to that of the sensor unit 10 shown in FIG. 6 in Embodiment 1. Constituent elements in this embodiment identical to those in Embodiment 1 are denoted by same reference numerals as those in Embodiment 1, and description thereof is omitted. Although an index grating in this embodiment has a grating pitch different from that in Embodiment 1, the index grating is denoted by reference numeral 15.

The light source grating 14 has a grating pitch $P_1$ of 16 μm, and the scale grating 21 has a grating pitch $P_2$ of 8 μm.

Also in this embodiment, the index grating 15 is divided in the direction (Y direction) orthogonal to the position detection direction (X direction) into two areas by the boundary line D as a straight line extending in the position detection direction. Of the two areas, one closer to the light source grating 14 (light emitting element 11) is defined as an area A, and the other one farther from the light source grating 14 is defined as an area B.

In the area A in the index grating 15, a first index grating (first pattern) having a first grating pitch in the position detection direction is provided. The first grating pitch $P_{3a}$ is 17.260851 μm. In the area B in the index grating 15, a second index grating (second pattern) having a second grating pitch in the position detection direction is provided. The second grating pitch $P_{3b}$ is 17.102296 μm.

A divergent light flux emitted from the light-emitting element 11 passes through the light source grating 14 and reaches the scale grating 21. A plus first-order diffracted light and a minus first-order diffracted light which are lights diffracted and reflected by the scale grating 21 interfere with each other on the index grating 15 to form interference fringes having a light intensity distribution with a period of 16 μm. On the other hand, since the first and second grating pitches $P_{3a}$ and $P_{3b}$ of the index grating 15 are slightly different from (larger than) 16 μm, a light intensity distribution (interference fringes) on which a coarser spatial period Pm than that of the original interference fringes is superimposed passes through the index grating 15.

When $P_3$ represents the grating pitch ($P_{3a}$, $P_{3b}$) of the index grating 15, the spatial period Pm can be expressed by the following expression:

$$Pm = ABS(2 \cdot P_2 \cdot P_3 / (2 \cdot P_2 - P_3))$$

where ABS(x) represents a function showing an absolute value of x.

The light intensity distribution with the spatial period Pm which has passed through the index grating 15 further propagates to be projected on the light-receiving element array 12 with an image magnification M. That is, on the light-receiving element array 12, a light intensity distribution with a spatial period $M \cdot P_m$ is formed. As shown in Embodiment 1, the image magnification M is expressed as follows:

$$M = (L_0 + L_1 + L_2)/(L_0 + L_1).$$

As in Embodiment 1, when $L_0 = L_1 = 1$ mm, and $L_2 = 0.2$ mm, $$M = (1 + 1 + 0.2)/(1 + 1)$$
$$= 1.1.$$

For this reason, on the light-receiving element array 12, a light intensity distribution (first light intensity distribution) with the following spatial period (first spatial period) $M \cdot P_m$ is formed by the first index grating (area A).

$$M \cdot P_m = 1.1 \times ABS(2 \times 8 \times 17.260851/(2 \times 8 - 17.260851))$$
$$= 240.9412 \text{ μm}.$$

Furthermore, a light intensity distribution (second light intensity distribution) with the following spatial period (second spatial period) $M \cdot P_m$ is formed by the second index grating (area B).

$$M \cdot P_m = 1.1 \times ABS(2 \times 8 \times 17.102296/(2 \times 8 - 17.102296))$$
$$= 273.0667 \text{ μm}.$$

Thus, on the light-receiving element array 12, the light intensity distribution with a shorter spatial period (240.9412 μm) than the in-group element pitch $P_{pd}$ (256 μm) which is the pitch between the light-receiving elements constituting the same light-receiving element group and the light intensity distribution with a longer spatial period (273.0667 μm) than the in-group element pitch $P_{pd}$ are formed. That is, the index grating 15 includes the first index grating (area A) forming the light intensity distribution with the shorter spatial period than the in-group element pitch $P_{pd}$ on the light-receiving element array 12 and the second index grating (area B) forming the light intensity distribution with the longer spatial period than the in-group element pitch $P_{pd}$ thereon.

A response characteristic of the sinusoidal output from the light-receiving element array 12 (IV conversion amplifier) to a spatial frequency of the light intensity distribution projected (formed) on the light-receiving element array 12 has a peak at $1/P_{pd}$.

That is, when $M \cdot P_m = P_{pd}$, a signal amplitude of the sinusoidal output becomes maximum.

When $P_{3max}$ represents the grating pitch $P_3$ of the index grating 15 corresponding to when the signal amplitude of the sinusoidal output becomes maximum, the following equation holds:

$$P_{3max} = \frac{P_{pd} \cdot 2P_2 \cdot (L_0 + L_1)}{P_{pd} \cdot (L_0 + L_1) \pm 2P_2 \cdot (L_0 + L_1 + L_2)}.$$

$P_{3max1}$ and $P_{3max2}$ representing two solutions of the above equation can be expressed as follows:

$$P_{3max1} = \frac{P_{pd} \cdot 2P_2 \cdot (L_0 + L_1)}{P_{pd} \cdot (L_0 + L_1) + 2P_2 \cdot (L_0 + L_1 + L_2)}$$

$$P_{3max2} = \frac{P_{pd} \cdot 2P_2 \cdot (L_0 + L_1)}{P_{pd} \cdot (L_0 + L_1) - 2P_2 \cdot (L_0 + L_1 + L_2)}.$$

Figure 12:
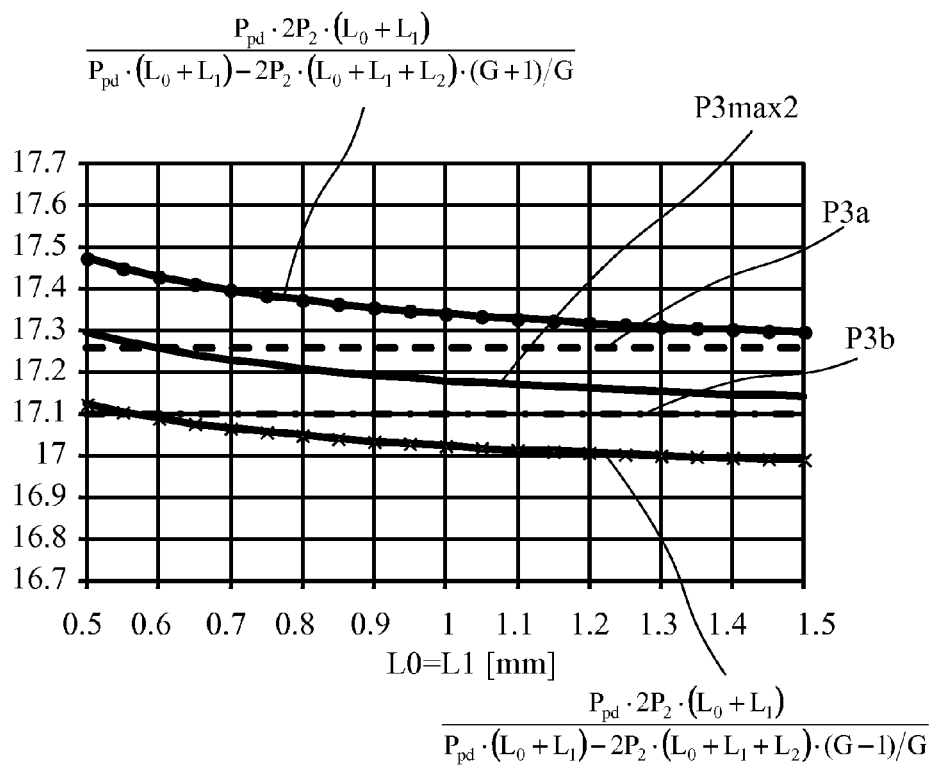
FIG. 12 is a graph showing a relation between $L_0$, $L_1$ and $P_{3max2}$, $P_{3a}$, $P_{3b}$ in an optical encoder of Embodiment 4.

FIG. 12 shows a relation between $L_0$, $L_1$ and $P_{3max2}$, $P_{3a}$, $P_{3b}$ in this embodiment. As understood from FIG. 12, $P_{3a}$ and $P_{3b}$ satisfy a relation (condition) expressed by following expression (5) in a range of $L_0 = L_1 = 1 \pm 0.3$ mm:

$$P_{3a} > \frac{P_{pd} \cdot 2P_2 \cdot (L_0 + L_1)}{P_{pd} \cdot (L_0 + L_1) - 2P_2 \cdot (L_0 + L_1 + L_2)} = P_{3max2} > P_{3b}. \quad (5)$$

Figure 13A:
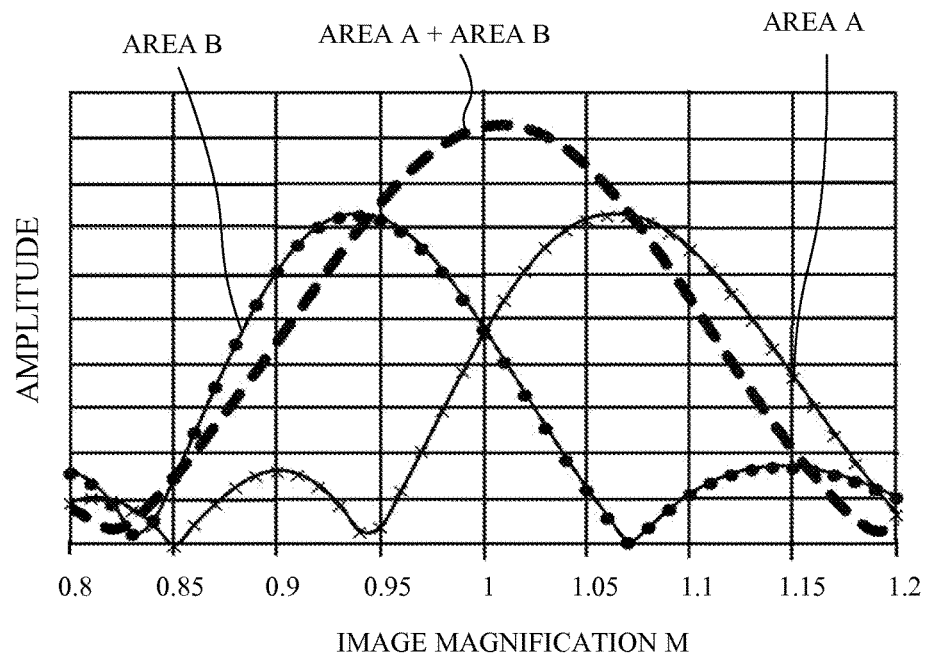
FIG. 13A is a graph showing a change of a signal amplitude of an A(+) phase to an image magnification M in the encoder of Embodiment 4.
Figure 13B:
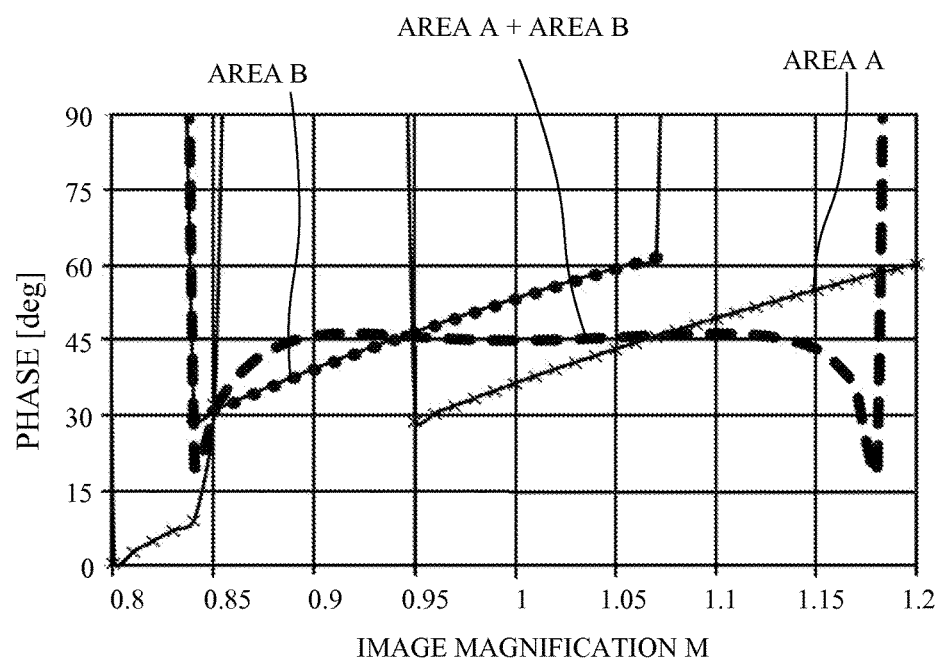
FIG. 13B is a graph showing a change of a signal phase to the image magnification M in the encoder of Embodiment 4.

FIG. 13A shows a change of the signal amplitude of the A(+) phase with respect to the image magnification M in this embodiment, and FIG. 13B shows a change of the signal phase of the A (+) phase with respect to the image magnification M in this embodiment. A signal generated by the light-receiving element array 12 corresponding to the light intensity distribution formed by the first index grating (area A) of the index grating 15 is referred to as "an area A signal", which is simply shown as "AREA A" in the figures. A signal generated by the light-receiving element array 12 corresponding to the light intensity distribution formed by the second index grating (area B) of the index grating 15 is referred to as "an area B signal", which is simply shown as "AREA B" in the figures.

As shown in FIG. 13A, amplitudes of the area A and area B signals have, by the satisfaction of the above relation shown by expression (5), mutually different peak points for variation of the image magnification M. As a result, an amplitude fluctuation of the output signal of each phase from the light-receiving element array 12 which is generated by adding the area A and area B signals together is suppressed.

Furthermore, as shown in FIG. 13B, phases of the area A and area B signals respectively change with variation of the image magnification M. However, the satisfaction of the above relation shown by expression (5) changes weights of the area A and area B signals such that their phase fluctuations are mutually canceled, and thereby the phase fluctuation of the output signal of each phase from the light-receiving element array 12 which is generated by adding the area A and area B signals together is suppressed. This applies to the B(+) phase, the A(−) phase and the B(−) phase.

When $P_{3a}$ and $P_{3b}$ satisfy a relation (condition) expressed by following expression (6), same effects as those described above are provided.

$$P_{3a} < \frac{P_{pd} \cdot 2P_2 \cdot (L_0 + L_1)}{P_{pd} \cdot (L_0 + L_1) + 2P_2 \cdot (L_0 + L_1 + L_2)} < P_{3b}. \quad (6)$$

That is, it is sufficient that the grating pitch (first grating pitch) $P_{3a}$ of the first index grating and the grating pitch (second grating pitch) $P_{3b}$ of the second index grating satisfy the relation shown by expression (5) or (6).

Moreover, when M represents number of the multiple light-receiving elements included in the light-receiving element array 12, N represents number of the light-receiving elements constituting each light-receiving element group, and G represents number of the light-receiving element groups (G=M/N=32/8=4 in this embodiment as in Embodiment 1), it is desirable that the grating pitch $P_{3a}$ of the first index grating and the grating pitch $P_{3b}$ of the second index grating satisfy a relation shown by following expression (7) or (8):

$$\frac{P_{pd} \cdot 2P_2 \cdot (L_0 + L_1)}{P_{pd} \cdot (L_0 + L_1) + 2P_2 \cdot (L_0 + L_1 + L_2) \cdot (G+1)/G} \leq \quad (7)$$

$$P_{3a} < \frac{P_{pd} \cdot 2P_2 \cdot (L_0 + L_1)}{P_{pd} \cdot (L_0 + L_1) + 2P_2 \cdot (L_0 + L_1 + L_2)} < P_{3b} \leq$$

$$\frac{P_{pd} \cdot 2P_2 \cdot (L_0 + L_1)}{P_{pd} \cdot (L_0 + L_1) + 2P_2 \cdot (L_0 + L_1 + L_2) \cdot (G-1)/G}$$

$$\frac{P_{pd} \cdot 2P_2 \cdot (L_0 + L_1)}{P_{pd} \cdot (L_0 + L_1) - 2P_2 \cdot (L_0 + L_1 + L_2) \cdot (G+1)/G} \geq \quad (8)$$

$$P_{3a} > \frac{P_{pd} \cdot 2P_2 \cdot (L_0 + L_1)}{P_{pd} \cdot (L_0 + L_1) - 2P_2 \cdot (L_0 + L_1 + L_2)} > P_{3b} \geq$$

$$\frac{P_{pd} \cdot 2P_2 \cdot (L_0 + L_1)}{P_{pd} \cdot (L_0 + L_1) - 2P_2 \cdot (L_0 + L_1 + L_2) \cdot (G-1)/G}.$$

Satisfying the relation shown by expression (7) or (8) monotonously increases one of the amplitude fluctuations of the area A and area B signals and monotonously decreases the other thereof for the variation of the image magnification M. This satisfaction of the relation enables enhancing the effect of suppressing the amplitude fluctuation of the output signal of each phase from the light-receiving element array 12 which is generated by adding the area A and area B signals together.

As described above, this embodiment enables realizing a high resolution encoder whose position detection accuracy is little influenced by assembly errors of the sensor unit 10 and scale 20.

The index grating 15 in the encoder of this embodiment may be alternatively configured so that its grating pitch continuously changes as described in Embodiment 3.

Furthermore, each of the above embodiments described the case where the scale is provided with one type of the scale grating having the same grating pitch. However, the configuration described in each of the above embodiments can apply to an encoder in which its scale is provided with scale gratings having mutually different pitches and which detects position by using a vernier calculation and the like.

Moreover, each of the above embodiments described the reflective encoder in which the light from the light source is reflected by the scale (scale grating) and is received by the light-receiving element array. However, the configuration described in each of the above embodiments can apply to a transmissive encoder in which light from a light source is transmitted through a scale and is received by a light-receiving element array.

In addition, although each of the above embodiments described the linear encoder, a rotary encoder having a similar configuration to that of each of the above embodiments can provide same effects as those of each of the above embodiments.

Embodiment 5

Figure 14:
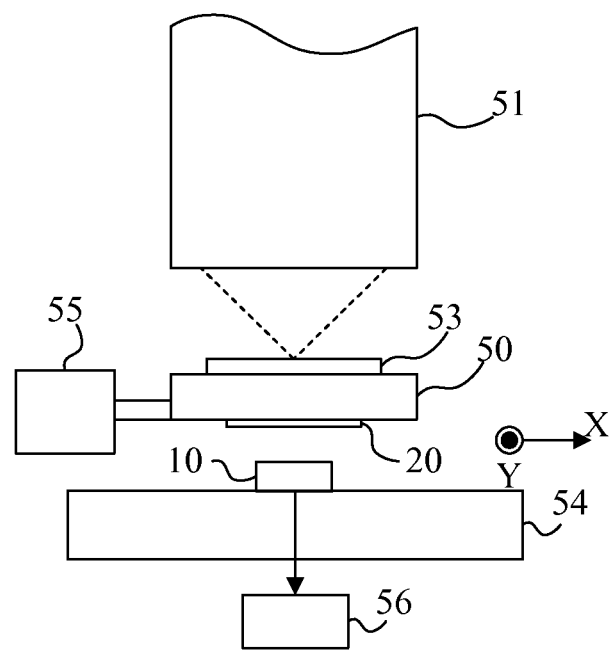
FIG. 14 shows a configuration of an exposure apparatus that is Embodiment 5 of the present invention.

FIG. 14 shows an exposure apparatus as an example of apparatuses including the encoder described in Embodiment 1. The exposure apparatus exposes a semiconductor wafer to form thereon electronic circuits. This exposure apparatus uses the encoder in order to detect position of a stage on which the wafer is mounted and which is driven two-dimensionally.

In FIG. 14, reference numeral 50 denotes the stage as a movable portion configured to perform a movement operation. On the stage 50, the wafer 53 is mounted. Reference numeral 51 denotes a projection optical system through which an electronic circuit image that is an optical image of a mask (not shown) is projected onto the wafer 53 to expose the wafer 53. The stage 50 is driven through a driving mechanism 55 in an X direction and a Y direction with respect to the projection optical system 51, which controls a projection position of the electronic circuit image on the wafer 53.

Reference numeral 20 denotes the scale of the encoder of Embodiment 1, and reference numeral 10 denotes the sensor unit in Embodiment 1. The scale 20 is attached to the stage 50, and the sensor unit 10 is attached to a chassis 54 that is an immovable portion of the exposure apparatus. Instead of the encoder, any one of the encoders described in Embodiments 2 to 4 may be used.

Reference numeral 56 denotes a controller configured to calculate the position of the stage 50 using output from the light-receiving element array (12 in FIG. 1) in the sensor unit 10 and controls the driving mechanism 55.

As just described, using the encoder of Embodiment 1 (or of Embodiments 2 to 4) enables stably detecting the position of the stage 50 in the exposure apparatus with a high resolution, which enables highly accurately controlling the position (or movement) of the stage 50.

The encoders described in Embodiments 1 to 4 can be used not only for the position detection of the stage in the exposure apparatus described above, but also for position detection of a movable portion in various apparatuses such as a robot arm and a conveying apparatus.

Each of the above embodiments realizes an optical encoder in which influence of assembly errors to its position detection accuracy is little and which is thereby capable of achieving a high position detection resolution. Accordingly, using this optical encoder enables highly accurately controlling operations of a movable portion in various apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-079401, filed on Apr. 8, 2014, which is hereby incorporated by reference wherein in its entirety.

What is claimed is:

1. An optical encoder comprising:
a scale provided with a scale pattern that reflects or transmits light from a light source;
a sensor configured to receive the light from the scale pattern, the sensor and the scale being moved relative to each other in a relative movement direction; and
an intermediate pattern provided between the scale and the sensor,
wherein:
the sensor is provided with multiple light-receiving element groups each including plural light-receiving elements, the light-receiving elements being arranged on the sensor with a pitch P in the relative movement direction, and outputs of the plural light-receiving elements within each light-receiving element group being added together;
the intermediate pattern includes a first pattern to form a first light intensity distribution with a first spatial period shorter than the pitch P and a second pattern to form a second light intensity distribution with a second spatial period longer than the pitch P;
a position of the intermediate pattern and a position of the sensor are relatively fixed with each other; and
the first pattern and the second pattern are arranged in a direction perpendicular to the relative movement direction.

2. An optical encoder according to claim 1, wherein one of the following conditions is satisfied:

$$P_{3a} < \frac{P \cdot P_2 \cdot (L_0 + L_1)}{P \cdot (L_0 + L_1) + P_2 \cdot (L_0 + L_1 + L_2)} < P_{3b}$$

$$P_{3a} > \frac{P \cdot P_2 \cdot (L_0 + L_1)}{P \cdot (L_0 + L_1) - P_2 \cdot (L_0 + L_1 + L_2)} > P_{3b}$$

where $P_{3a}$ represents a pitch of the first pattern, $P_{3b}$ represents a pitch of the second pattern, $P_2$ represents a pitch of the scale pattern, $L_0$ represents a distance between the light source and the scale pattern, $L_1$ represents a distance between the scale pattern and the intermediate pattern, and $L_2$ represents a distance between the intermediate pattern and a light-receiving element array constituted by the plural light-receiving elements.

3. An optical encoder according to claim 1, wherein the plural light-receiving elements are constituted by M light-receiving elements, each of the light-receiving element groups is constituted by N light-receiving elements, and one of the following conditions is satisfied:

$$\frac{P_{pd} \cdot P_2 \cdot (L_0 + L_1)}{P_{pd} \cdot (L_0 + L_1) + P_2 \cdot (L_0 + L_1 + L_2) \cdot (G+1)/G} \leq$$

$$P_{3a} < \frac{P_{pd} \cdot P_2 \cdot (L_0 + L_1)}{P_{pd} \cdot (L_0 + L_1) + P_2 \cdot (L_0 + L_1 + L_2)} < P_{3b} \leq$$

$$\frac{P_{pd} \cdot P_2 \cdot (L_0 + L_1)}{P_{pd} \cdot (L_0 + L_1) + P_2 \cdot (L_0 + L_1 + L_2) \cdot (G-1)/G}$$

$$\frac{P_{pd} \cdot P_2 \cdot (L_0 + L_1)}{P_{pd} \cdot (L_0 + L_1) - P_2 \cdot (L_0 + L_1 + L_2) \cdot (G+1)/G} \geq$$

$$P_{3a} > \frac{P_{pd} \cdot P_2 \cdot (L_0 + L_1)}{P_{pd} \cdot (L_0 + L_1) - P_2 \cdot (L_0 + L_1 + L_2)} > P_{3b} \geq$$

$$\frac{P_{pd} \cdot P_2 \cdot (L_0 + L_1)}{P_{pd} \cdot (L_0 + L_1) - P_2 \cdot (L_0 + L_1 + L_2) \cdot (G-1)/G}$$

where G represents number of the light-receiving element groups, which is expressed by G=M/N, $P_{3a}$ represents a pitch of the first pattern, $P_{3b}$ represents a pitch of the second pattern, $P_2$ represents a pitch of the scale pattern, $P_{pd}$ represents a pitch of light-receiving elements within the same light-receiving element group, $L_0$ represents a distance between the light source and the scale pattern, $L_1$ represents a distance between the scale pattern and the intermediate pattern, and $L_2$ represents a distance between the intermediate pattern and a light-receiving element array constituted by the plural light-receiving elements.

4. An optical encoder according to claim 1, wherein one of the following conditions is satisfied:

$$P_{3a} < \frac{P \cdot 2P_2 \cdot (L_0 + L_1)}{P \cdot (L_0 + L_1) + 2P_2 \cdot (L_0 + L_1 + L_2)} < P_{3b}$$

$$P_{3a} > \frac{P \cdot 2P_2 \cdot (L_0 + L_1)}{P \cdot (L_0 + L_1) - 2P_2 \cdot (L_0 + L_1 + L_2)} > P_{3b}$$

where $P_{1a}$ represents a pitch of the first pattern, $P_{3b}$ represents a pitch of the second pattern, $P_2$ represents a pitch of the scale pattern, $L_0$ represents a distance between the light source and the scale pattern, $L_1$ represents a distance between the scale pattern and the intermediate pattern, and $L_2$ represents a distance between the intermediate pattern and a light-receiving element array constituted by the plural light-receiving elements.

5. An optical encoder according to claim 1, wherein the plural light-receiving elements are constituted by M light-receiving elements, each of the light-receiving element groups is constituted by N light-receiving elements, and one of the following conditions is satisfied:

$$\frac{P_{pd} \cdot 2P_2 \cdot (L_0 + L_1)}{P_{pd} \cdot (L_0 + L_1) + 2P_2 \cdot (L_0 + L_1 + L_2) \cdot (G+1)/G} \leq$$

$$P_{3a} < \frac{P_{pd} \cdot 2P_2 \cdot (L_0 + L_1)}{P_{pd} \cdot (L_0 + L_1) + 2P_2 \cdot (L_0 + L_1 + L_2)} < P_{3b} \leq$$

$$\frac{P_{pd} \cdot 2P_2 \cdot (L_0 + L_1)}{P_{pd} \cdot (L_0 + L_1) + 2P_2 \cdot (L_0 + L_1 + L_2) \cdot (G-1)/G}$$

$$\frac{P_{pd} \cdot 2P_2 \cdot (L_0 + L_1)}{P_{pd} \cdot (L_0 + L_1) - 2P_2 \cdot (L_0 + L_1 + L_2) \cdot (G+1)/G} \geq$$

$$P_{3a} > \frac{P_{pd} \cdot 2P_2 \cdot (L_0 + L_1)}{P_{pd} \cdot (L_0 + L_1) - 2P_2 \cdot (L_0 + L_1 + L_2)} > P_{3b} \geq$$

$$\frac{P_{pd} \cdot 2P_2 \cdot (L_0 + L_1)}{P_{pd} \cdot (L_0 + L_1) - 2P_2 \cdot (L_0 + L_1 + L_2) \cdot (G-1)/G}$$

where G represents number of the light-receiving element groups, which is expressed as G=M/N, $P_{3a}$ represents a pitch of the first pattern, $P_{3b}$ represents a pitch of the second pattern, $P_2$ represents a pitch of the scale pattern, $P_{pd}$ represents a pitch of light-receiving elements within the same light-receiving element group, $L_0$ represents a distance between the light source and the scale pattern, $L_1$ represents a distance between the scale pattern and the intermediate pattern, and $L_2$ represents a distance between the intermediate pattern and a light-receiving element array constituted by the plural light-receiving elements.

6. An optical encoder according to claim 1, wherein pitches of the first and second patterns in the intermediate pattern continuously change.

7. An optical encoder according to claim 1, wherein the intermediate pattern includes a first pattern to form a first light intensity distribution with a first spatial period shorter than the pitch P on the light-receiving element array and a second pattern to form a second light intensity distribution with a second spatial period longer than the pitch P on the light-receiving element array.

8. An apparatus comprising:
a movable portion configured to perform an operation;
an optical encoder; and
a controller configured to control the operation of the movable portion by using output from the optical encoder,
wherein the optical encoder comprises:
a scale provided with a scale pattern that reflects or transmits light from a light source;
a sensor configured to receive the light from the scale pattern, the sensor and the scale being moved relative to each other in a relative movement direction; and
an intermediate pattern provided between the scale and the sensor,
wherein:
the sensor is provided with multiple light-receiving element groups each including plural light-receiving elements, the light-receiving elements being arranged on the sensor with a pitch P in the relative movement direction, and outputs of the plural light-receiving elements within each light-receiving element group being added together;
the intermediate pattern includes a first pattern to form a first light intensity distribution with a first spatial period shorter than the pitch P and a second pattern to form a second light intensity distribution with a second spatial period longer than the pitch P;
a position of the intermediate pattern and a position of the sensor are relatively fixed with each other; and
the first pattern and the second pattern are arranged in a direction perpendicular to the relative movement direction.

9. An optical encoder according to claim 1, wherein each light receiving element included in the multiple light-receiving element groups receives both of light via the first pattern and light via the second pattern.

10. An optical encoder comprising:
a scale provided with a scale pattern that reflects or transmits light from a light source;
a sensor configured to receive the light from the scale pattern, the sensor and the scale being moved relative to each other in a relative movement direction; and
an intermediate pattern provided between the scale and the sensor, wherein:
the sensor is provided with multiple light-receiving element groups each including plural light-receiving elements arranged with a pitch P in the relative movement direction, outputs of the plural light-receiving elements being added together;
the first pattern and the second pattern are arranged in a direction perpendicular to the relative movement direction; and
one of the following conditions is satisfied:

$$P_{3a} < \frac{P \cdot P_2 \cdot (L_0 + L_1)}{P \cdot (L_0 + L_1) + P_2 \cdot (L_0 + L_1 + L_2)} < P_{3b}$$

$$P_{3a} > \frac{P \cdot P_2 \cdot (L_0 + L_1)}{P \cdot (L_0 + L_1) - P_2 \cdot (L_0 + L_1 + L_2)} > P_{3b}$$

where $P_{3a}$ represents a pitch of the first pattern, $P_{3b}$ represents a pitch of the second pattern, $P_2$ represents a pitch of the scale pattern, $L_0$ represents a distance between the light source and the scale pattern, $L_1$ represents a distance between the scale pattern and the intermediate pattern, and $L_2$ represents a distance between the intermediate pattern and a light-receiving element array constituted by the plural light-receiving elements.

11. An optical encoder according to claim 10, wherein each light receiving element included in the multiple light-receiving element groups receives both of light via the first pattern and light via the second pattern.

12. An apparatus comprising:
a movable portion configured to perform an operation;
an optical encoder; and
a controller configured to control the operation of the movable portion by using output from the optical encoder,
wherein the optical encoder comprises:
a scale provided with a scale pattern that reflects or transmits light from a light source;
a sensor configured to receive the light from the scale pattern, the sensor and the scale being moved relative to each other in a relative movement direction; and
an intermediate pattern provided between the scale and the sensor, wherein:
the sensor is provided with multiple light-receiving element groups each including plural light-receiving elements arranged with a pitch P in the relative movement direction, outputs of the plural light-receiving elements being added together;
the first pattern and the second pattern are arranged in a direction perpendicular to the relative movement direction; and
one of the following conditions is satisfied:

$$P_{3a} < \frac{P \cdot P_2 \cdot (L_0 + L_1)}{P \cdot (L_0 + L_1) + P_2 \cdot (L_0 + L_1 + L_2)} < P_{3b}$$

$$P_{3a} > \frac{P \cdot P_2 \cdot (L_0 + L_1)}{P \cdot (L_0 + L_1) - P_2 \cdot (L_0 + L_1 + L_2)} > P_{3b}$$

where $P_{2a}$ represents a pitch of the first pattern, $P_{3b}$ represents a pitch of the second pattern, $P_2$ represents a pitch of the scale pattern, $L_0$ represents a distance between the light source and the scale pattern, $L_1$ represents a distance between the scale pattern and the intermediate pattern, and $L_2$ represents a distance between the intermediate pattern and a light-receiving element array constituted by the plural light-receiving elements.

* * * * *